(12) United States Patent
Xie et al.

(10) Patent No.: US 9,934,281 B2
(45) Date of Patent: Apr. 3, 2018

(54) COMBINATION OF DATASETS WITH USE OF A DATASET FILTER

(71) Applicant: HUA ZHONG UNIVERSITY OF SCIENCE TECHNOLOGY, Wuhan (CN)

(72) Inventors: Xia Xie, Wuhan (CN); Hai Jin, Wuhan (CN); Shuwen Luo, Wuhen (CN)

(73) Assignee: Hua Zhong University of Science Technology, Hubei (CN)

( * ) Notice: Subject to any disclaimer, the term of this patent is extended or adjusted under 35 U.S.C. 154(b) by 0 days.

(21) Appl. No.: 15/126,248

(22) PCT Filed: Oct. 10, 2015

(86) PCT No.: PCT/CN2015/091632
§ 371 (c)(1),
(2) Date: Sep. 14, 2016

(87) PCT Pub. No.: WO2017/059592
PCT Pub. Date: Apr. 13, 2017

(65) Prior Publication Data
US 2017/0262505 A1    Sep. 14, 2017

(51) Int. Cl.
*G06F 17/30* (2006.01)
(52) U.S. Cl.
CPC .. *G06F 17/30498* (2013.01); *G06F 17/30345* (2013.01)
(58) Field of Classification Search
CPC .................................................. G06F 17/30498
(Continued)

(56) References Cited

U.S. PATENT DOCUMENTS

2004/0068575 A1* 4/2004 Cruise .................... H04L 69/16
                                                                 709/232
2007/0299865 A1   12/2007 Nakano et al.
(Continued)

FOREIGN PATENT DOCUMENTS

CN           102193983 A        9/2011

OTHER PUBLICATIONS

Okcan, A., and Riedewald, M., "Processing Theta-Joins using MapReduce," Proceedings of the 2011 ACM SIGMOD International Conference of Management of data, SIGMOD pp. 949-960 (Jan. 2011).*

(Continued)

*Primary Examiner* — Syling Yen
*Assistant Examiner* — Allen Lin
(74) *Attorney, Agent, or Firm* — Morrit Hock & Hamroff LLP; Steven S. Robin, Esq.

(57) ABSTRACT

Technologies are generally described for methods and systems to join a first source dataset with a second source dataset. In an example, a processor may receive a request to join the first and second source datasets based on a condition. The processor may determine a first range of attribute values from the first source dataset, and a second range of attribute values from the second source dataset. The processor may produce a filtered dataset based on a comparison of the first and second ranges. A map unit may transform the filtered dataset and the second source dataset into first and second mapped datasets based on the condition. A reduce unit may transform the first and second mapped datasets into first and second reduced datasets based on the condition. A combiner unit may combine the first and second reduced datasets to join the first and second source datasets.

18 Claims, 6 Drawing Sheets

(58) Field of Classification Search
USPC .......................................................... 707/714
See application file for complete search history.

(56) References Cited

U.S. PATENT DOCUMENTS

| | | | |
|---|---|---|---|
| 2011/0283231 A1* | 11/2011 | Richstein | G06F 3/0488 715/810 |
| 2012/0310916 A1 | 12/2012 | Abadi et al. | |
| 2014/0074824 A1* | 3/2014 | Rad | G06Q 50/01 707/722 |
| 2015/0088868 A1 | 3/2015 | Jordan et al. | |
| 2015/0149437 A1 | 5/2015 | Sundarrajan et al. | |
| 2017/0011072 A1* | 1/2017 | Tsirulnik | G06F 17/30292 |

OTHER PUBLICATIONS

Blanas, S., et al., "A Comparison of Join Algorithms for Log Processing in MapReduce," Proceedings of the 2010 international conference on Management of data, pp. 975-986 (Jun. 6-11, 2010).

Dean, J., and Ghemawat, S., "MapReduce: Simplified Data Processing on Large Clusters," Proceedings of the 6th conference on Symposium on Opearting Systems Design & Implementation, pp. 1-13 (Oct. 3, 2004).

International Search Report and Written Opinion for International Application No. PCT/CN2015/091632 dated Jul. 14, 2016, pp. 8.

Jiang, M., and Wang, Y., "Optimization of Multi-Join Query Processing within MapReduce," IEEE 4th International Universal Communication Symposium (IUCS), pp. 77-83 (Oct. 18-19, 2010).

Kolb, L., et al., "Load Balancing for MapReduce-based Entity Resolution," IEEE 28th International Conference on Data Engineering, pp. 618-629 (Apr. 1-5, 2012).

Okcan, A., and Riedewald, M., "Processing Theta-Joins using MapReduce," Proceedings of the 2011 ACM SIGMOD International Conference on Management of data, SIGMOD, pp. 949-960 (Jan. 2011).

Shim, K., "MapReduce Algorithms for Big Data Analysis," Seoul National University, pp. 1-261 (2013).

Yoo, D., and Sim, K.M., "A comparative review of job scheduling for MapReduce," IEEE International Conference on Cloud Computing and Intelligence Systems (CCIS), pp. 353-358 (Sep. 15-17, 2011).

Zhang, C., et al., "Efficient Processing Distributed Joins with Bloomfilte rusing MapReduce," International Journal of and Grid Distributed Computing, vol. 6, No. 3, pp. 43-58 (Jun., 2013).

* cited by examiner

500 A computer program product.

502 A signal bearing medium.

504

At least one of

One or more instructions to join a first source dataset with a second source dataset; or One or more instructions to receive a request to join the first source dataset with the second source dataset based on a condition, wherein the condition is associated with an attribute of the first source dataset and the second source dataset; or One or more instructions to determine a first range of a first set of attribute values, wherein the first set of attribute values corresponds to the first source dataset, and the first set of attribute values is associated with the attribute; or One or more instructions to determine a second range of a second set of attribute values, wherein the second set of attribute values corresponds to the second source dataset, and the second set of attribute values is associated with the attribute; or One or more instructions to compare the first range with the second range to produce a comparison result; or One or more instructions to produce, a filtered dataset based on the comparison result, wherein the filtered dataset includes at least a portion of the first source dataset; or One or more instructions to transform the filtered dataset into a first mapped dataset based on the condition; or One or more instructions to transform the second source dataset into a second mapped dataset based on the condition; or One or more instructions to transform the first mapped dataset into a first reduced dataset based on the condition; or One or more instructions to transform the second mapped dataset into a second reduced dataset based on the condition; or

One or more instructions to combine the first reduced dataset with the second reduced dataset to join the first source dataset and the second source dataset.

506 A computer readable medium

508 A recordable medium

510 A communications medium

Fig. 5

COMBINATION OF DATASETS WITH USE OF A DATASET FILTER

CROSS-REFERENCE TO RELATED APPLICATION

This Application is a U.S. National Stage filing under 35 U.S.C. § 371 of International Application No. PCT/CN2015/091632, filed on Oct. 10, 2015. The disclosure of International Application No. PCT/CN2015/091632 is incorporated herein by reference in its entirety.

BACKGROUND

Unless otherwise indicated herein, the materials described in this section are not prior art to the claims in this application and are not admitted to be prior art by inclusion in this section.

When processing and generating large datasets, a first dataset may be joined with a second dataset based on a condition. By way of example, in a MapReduce framework, a first dataset and a second dataset may be divided into parts, where the parts may be distributed to one or more mappers. The one or more mappers may be configured to map the parts of the first and second datasets to produce an output. One or more reducers may receive the output from the mappers, and may reduce the output from the mappers to facilitate a join of the first dataset with the second dataset.

SUMMARY

In some examples, methods to join a first dataset with a second dataset are generally described. The methods may include receiving, by a processor, a request to join the first source dataset with the second source dataset based on a condition. The condition may be associated with an attribute of the first source dataset and the second source dataset. The methods may also include determining, by the processor, a first range of a first set of attribute values. The first set of attribute values may correspond to the first source dataset, and the first set of attribute values may be associated with the attribute. The methods may also include determining, by the processor, a second range of a second set of attribute values. The second set of attribute values may correspond to the second source dataset, and the second set of attribute values may be associated with the attribute. The methods may also include comparing, by the processor, the first range with the second range to produce a comparison result. The methods may also include producing, by the processor, a filtered dataset based on the comparison result, where the filtered dataset may include at least a portion of the first source dataset. The methods may also include transforming, by a map unit, the filtered dataset into a first mapped dataset based on the condition. The methods may also include transforming, by the map unit, the second source dataset into a second mapped dataset based on the condition. The methods may also include transforming, by a reduce unit, the first mapped dataset into a first reduced dataset based on the condition. The methods may also include transforming, by the reduce unit, the second mapped dataset into a second reduced dataset based on the condition. The methods may also include combining, by a combiner unit, the first reduced dataset with the second reduced dataset to join the first source dataset and the second source dataset.

In some examples, systems effective to join a first source dataset with a second source dataset are generally described. The systems may include a memory. The memory may be configured to store the first source dataset and the second source dataset. The first source dataset may correspond to a first set of attribute values of an attribute. The second source dataset may correspond to a second set of attribute values of the attribute. The systems may also include a filter unit that may be configured to be in communication with the memory. The systems may also include a map unit that may be configured to be in communication with the memory and the filter unit. The systems may also include a reduce unit that may be configured to be in communication with the memory and the map unit. The systems may also include a combiner unit that may be configured to be in communication with the reduce unit. The filter unit may be configured to receive a request to join the first source dataset with the second source dataset based on a condition. The condition may be associated with the attribute. The filter unit may also be configured to determine a first range of the first set of attribute values. The filter unit may also be configured to determine a second range of the second set of attribute values. The filter unit may also be configured to compare the first range with the second range to produce a comparison result. The filter unit may also be configured to produce a filtered dataset based on the comparison result, where the filtered dataset may include at least a portion of the first dataset. The filter unit may also be configured to send the filtered dataset to the map unit. The map unit may be configured to transform the filtered dataset into a first mapped dataset based on the condition. The map unit may also be configured to transform the second source dataset into a second mapped dataset based on the condition. The map unit may also be configured to send the first and second mapped datasets to the reduce unit. The reduce unit may be configured to transform the first mapped dataset into a first reduced dataset. The reduce unit may also be configured to transform the second mapped dataset into a second reduced dataset. The reduce unit may also be configured to send the first and second reduced datasets to the combiner unit. The combiner unit may be configured to combine the first reduced dataset with the second reduced dataset to join the first source dataset and the second source dataset.

In some examples, systems effective to process a request to join a first source dataset with a source second dataset are generally described. The systems may include a memory. The memory may be configured to store a filter instruction. The systems may also include a processor that may be configured to be in communication with the memory. The systems may also include a node that may be configured to be in communication with the processor. The processor may be configured to receive the request to join the first source dataset with the source second dataset based on a condition. The condition may be associated with an attribute of the first source dataset and the second source dataset. The first source dataset may correspond to a first set of attribute values of the attribute. The second source dataset may correspond to a second set of attribute values of the attribute. The processor may also be configured to execute the filter instruction to generate a first command to determine a first range of the first set of attribute values. The processor may also be configured to execute the filter instruction to generate a second command to determine a second range of the second set of attribute values. The processor may also be configured to execute the filter instruction to generate a third command to compare the first range with the second range to produce a comparison result. The processor may also be configured to execute the filter instruction to generate a fourth command to produce a first filtered dataset based on the comparison result, wherein the first filtered dataset includes at least a portion of the first dataset. The processor may also be configured to execute the filter instruction to generate a fifth command to produce a second filtered dataset based on the comparison result, wherein the second filtered dataset includes at least a portion of the second dataset. The processor may also be configured to send the first, second, third, fourth, and fifth commands to the node.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 5 illustrates an example computer program product that can be utilized to implement combination of datasets with use of a dataset filter.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Briefly stated, technologies to join a first source dataset with a second source dataset are generally described. In an example, a processor may receive a request to join the first source dataset with the second source dataset based on a condition. The condition may be associated with an attribute of the first source dataset and the second source dataset. For example, the first source dataset may be a database including male users of a social media platform, and the second source dataset may be a database including female users of the social media platform. The request may be a request to pair male and female users based on the condition that the female user be younger the male user, where the age may be an attribute associated with the condition. The processor may determine a first range of a first set of attribute values, where the first set of attribute values may correspond to the first source dataset, and the first set of attribute values may be associated with the attribute. The processor may determine a second range of a second set of attribute values, where the second set of attribute values may correspond to the second source dataset, and the second set of attribute values may be associated with the attribute. For example, the processor may determine a first range of ages of the male users, and may determine a second range of ages of the female users. The processor may compare the first range with the second range to produce a comparison result. For example, the processor may compare the first range of ages of the male users with the second range of ages of the female users to produce a comparison result. The processor may produce a filtered dataset based on the comparison result, where the filtered dataset may include at least a portion of the first source dataset. For example, the processor may filter out a portion of the male users who do not satisfy the condition. The processor may send the filtered dataset and/or the second source dataset to a map unit. The map unit may transform the filtered dataset into a first mapped dataset based on the condition. The map unit may also transform the second source dataset into a second mapped dataset based on the condition. For example, the map unit may produce mapped datasets including names or identifiers of the male and female users, along with their age, and exclude attribute such as locations and jobs, etc. The map unit may send the first and second mapped datasets to a reduce unit. The reduce unit may transform the first mapped dataset into a first reduced dataset based on the condition. The reduce unit may also transform the second mapped dataset into a second reduced dataset based on the condition. For example, the reduce unit may pair the male and female users based on age, as indicated by the condition. The reduce unit may send the first and second reduced datasets to a combiner unit. The combiner unit may combine the first reduced dataset with the second reduced dataset to join the first source dataset and the second source dataset. For example, the combiner unit may combine different pairs of male and female users produced by the reduce unit to generate a joined dataset including the pairs.

Figure 1:
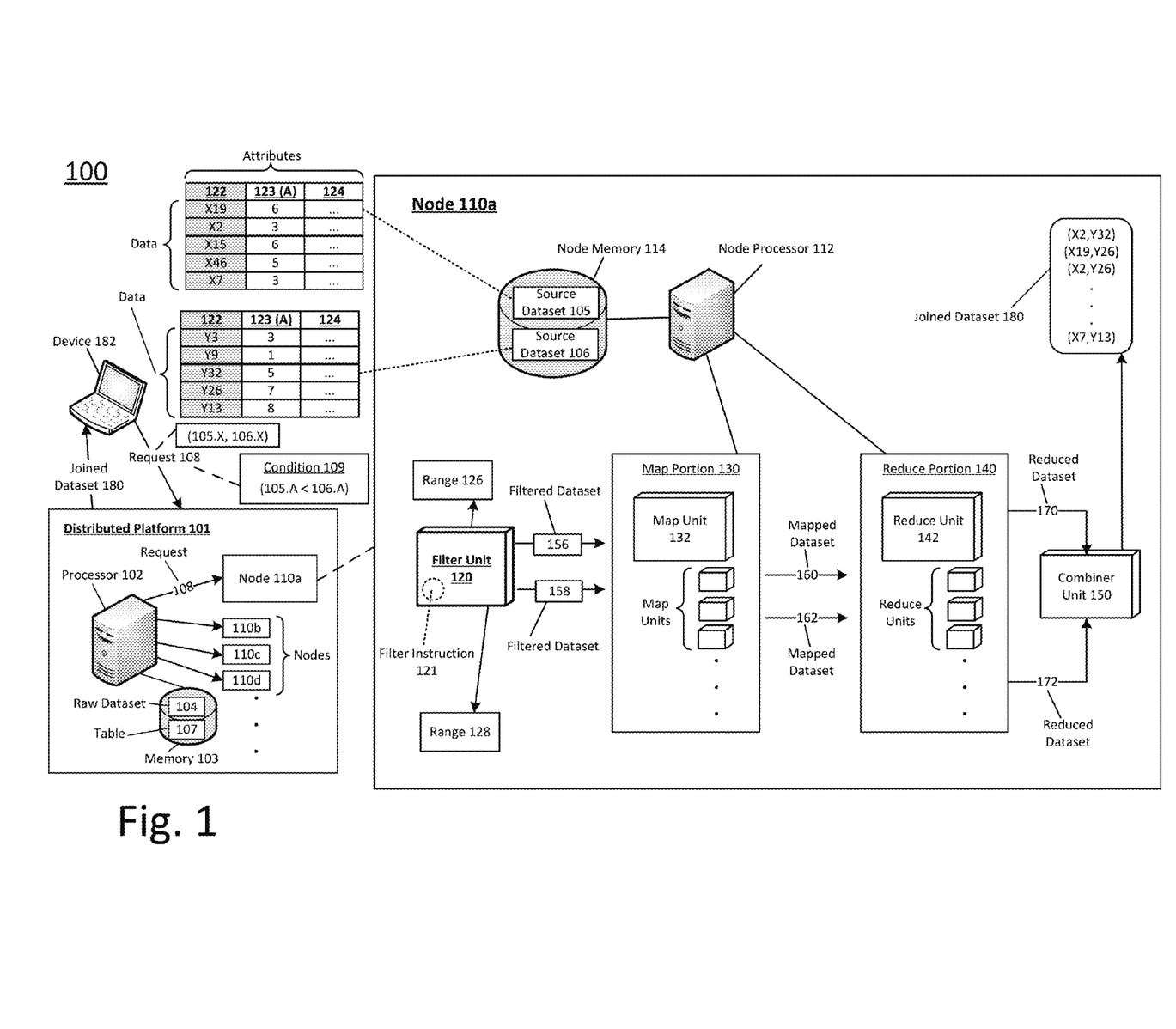
FIG. 1 illustrates an example system that can be utilized to implement combination of datasets with use of a dataset filter.

FIG. 1 illustrates an example system 100 that can be utilized to implement combination of datasets with use of a dataset filter, arranged in accordance with at least some embodiments described herein. System 100 may be implemented with or using a distributed platform 101 including one or more nodes, where each node may be a processor such as a single-core or a multi-core processor. In some examples, distributed platform 101 may be in a data center and each node may be a server. In some examples, each node in distributed platform 101 may be a system configured to perform operations on one or more datasets based on a MapReduce technique. In an example, distributed platform 101 may include a processor 102, a memory 103, and one or more nodes 110 (including nodes 110a, 110b, 110c, 110d, etc.), each configured to be in communication with each other. Memory 103 may be configured to store one or more raw datasets, such as a raw dataset 104. In an example where distributed platform 101 is associated with a cloud gaming platform, raw dataset 104 may include structured data such as user identification and corresponding attributes such as age, location, game level, player experience, player items, etc. In an example where distributed platform 101 is associated with a social media platform, raw dataset 104 may include structured data such as username and corresponding attributes such as gender, age, location, job title, relationship status, etc. Processor 102 may be configured to divide raw dataset 104 into two or more datasets, and may store the divided datasets in nodes 110. For example, processor 102 may divide raw dataset 104 into two or more datasets including a source dataset 105 and a source dataset 106. In some examples, processor 102 may store source dataset 105 and source dataset 106 in node 110*a*. In some examples, processor 102 may store source dataset 105 in node 110*a* and may store source dataset 106 in node 110*b*. In some examples, processor 102 may distribute more than one copy of dataset 105 and dataset 106 to be stored in node 110*a* and node 110*b*. Memory 103 may be configured to store a table 107, where table 107 may indicate storage locations of datasets, such as source datasets 105, 106. Processor 102 may be configured to update table 107 as datasets are being stored in nodes 110.

In an example depicted in FIG. 1, focusing on node 110*a*, each node 110 may include a node processor 112, a node memory 114, a filter unit 120, a map portion 130, a reduce portion 140, and/or a combiner unit 150 configured to be in communication with each other. In some examples, node 110 may include more than one filter unit 120, and/or may include more than one combiner unit 150. Each node 110 may include one or more units, where the units may be processors or processor cores, where each unit may be assigned, such as by node processor 112, to perform a specific operation. In some examples, one or more units, such as a map unit 132, may be assigned to map portion 130 to perform transformation operations on datasets to produce mapped datasets (further described below). In some examples, one or more units, such as a reduce unit 142, may be assigned to reduce portion 140 to perform transformation operations to datasets to produce reduced datasets (further described below). In some examples, a number of units in map portion 130 and reduce portion 140 may be same or different from each other. In some examples, filter unit 120 may be a part of map portion 130, or may be included in each map unit.

In the example depicted in FIG. 1, node memory 114 may be configured to store source dataset 105 and source dataset 106. Source datasets 105, 106 may include data corresponding to one or more attributes 122, 123, 124. In some examples, source dataset 105 and source dataset 106 may include the same or different attributes. For example, a particular piece of data among source dataset 105 may include an attribute value "X19" corresponding to attribute 122, and an attribute value "6" corresponding to attribute 123. Similarly, a particular piece of data among source dataset 106 may include an attribute value of "Y3" corresponding to attribute 122, and an attribute value "3" corresponding to attribute 123. In some examples, each source dataset 105, 106 may include relatively large amounts of data, such as one hundred, one thousand, one million pieces of data, etc.

In the example depicted in FIG. 1, a device 182 may send a request 108 to distributed platform 101, where request 108 may be a request to perform an operation on source dataset 105 and source dataset 106. Request 108 may indicate a condition 109 relating to the operation requested by request 108. For example, request 108 may be "105.X, 106.Y", which may be a request to perform a join operation on attribute 122 of both source dataset 105 and source dataset 106 based on condition 109. Condition 109 may be associated with one or more attributes, and may indicate a join attribute, such as attribute 123, upon which the join operation should be analyzed. For example, condition 109 may be "105.A<106.A", where attribute 123 "A" is indicated as a join attribute; "105.A" denotes attribute 123 corresponding to data among source dataset 105; and "106.A" denotes attribute 123 corresponding to data among source dataset 106. Condition 109 "105.A<106.A" may indicate a condition to join attribute 122 of source datasets 105, 106 if "105.A" is less than "106.A". For example, a join of "X19" and "Y26" may satisfy condition 109 because "X19" corresponds to an attribute value of "A=6" and "Y26" corresponds to an attribute value of "A=7". For example, a join of "X19" and "Y3" may fail to satisfy condition 109 because "X19" corresponds to an attribute value of "A=6" and "Y3" corresponds to an attribute value of "A=3", thus, "X19" and "Y3" may not be joined.

In some examples, processor 102 of distributed platform 101 may receive request 108 from device 182 and may identify indications of source dataset 105 and source dataset 106 indicated by request 108. Processor 102 may search for source datasets 105, 106 in table 107, and in response, may determine that source datasets 105, 106 are stored in node 110*a*. In response to determining that source datasets 105, 106 are stored in node 110*a*, processor 102 may assign node 110*a* to process request 108. In some examples, processor 102 may forward request 108 to node 110*a* such that node 110*a* may process request 108. In some examples, processor 102 may generate one or more commands (described below) for node 110*a* to process request 108.

Map portion 130, including map unit 132, may be configured to transform datasets, such as source datasets 105, 106, into mapped datasets 160, 162, based on request 108, (the transformation and mapped datasets will be further discussed below). Map portion 130 may send mapped datasets 160, 162 to reduce portion 140, where reduce portion 140 may transform mapped datasets 160, 162 to produce reduced datasets 170, 172 (the transformation and reduced datasets will be further described below). Reduce portion 140 may send reduced datasets 170, 172 to combiner unit 150, where combiner unit 150 may be configured to combine reduced datasets 170, 172, to join source datasets 105, 106. As a result of joining source datasets 105, 106, combiner unit may produce joined dataset 180, and may send joined dataset 180 to processor 102.

As will be described in more detail below, filter unit 120 may be activated, such as by node processor 112 or distributed platform 101, and may be configured to filter out one or more pieces of data among source datasets 105, 106 to produce filtered datasets 156, 158. Filter unit 120 may filter out data among source datasets 105, 106 to produce filtered datasets 156, 158, such that mapped portion 130 may transform filtered datasets 156, 158 instead of transforming source datasets 105, 106 to produce mapped datasets 160, 162. Filter unit 120 may filter out data among source datasets 105, 106 based on a filter instruction 121, where filter instruction 121 may include instructions to filter source dataset 105, 106 based on request 108 and/or condition 109. In some examples, filter instruction 121 may be stored in filter unit 120, node memory 114, and/or memory 103 of distributed platform 101. Filter unit 120 may execute filter instruction 121, or a command generated from processor 102, to determine a range 126 of source dataset 105, where range 126 may be a range of attribute values of attribute 123 among source dataset 105. Dataset filter unit 120 may execute filter instruction 121, or a command generated from processor 102, to determine a range 128 of dataset 106, where range 128 may be a range of attribute values of attribute 123 among dataset 106. Dataset filter unit 120 may be configured to execute filter instruction 121, or a command generated from processor 102, to filter source datasets 105, 106 based on ranges 126, 128, to produce filtered datasets 156, 158. As a result of filtering out data of source dataset 105, 106, an amount of data being transmitted to map portion 130 may be relatively less compared to an amount of data among source datasets 105, 106.

Figure 2:
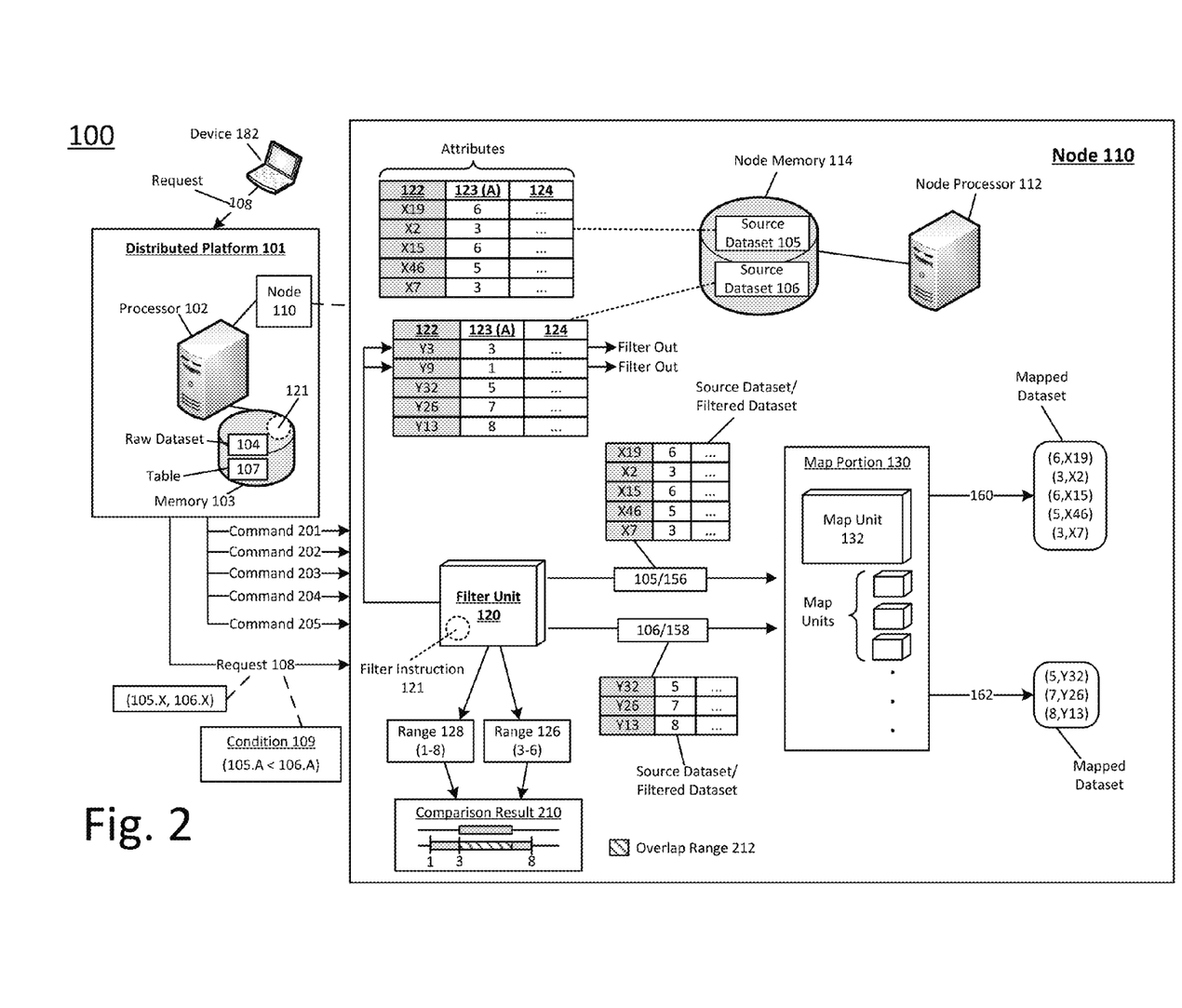
FIG. 2 illustrates the example system of FIG. 1 with additional detail relating to a production of filtered datasets and mapped datasets.

FIG. 2 illustrates example system 100 of FIG. 1 with additional detail relating to production of filtered datasets and mapped datasets, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity.

As discussed below, filter unit 120 may determine range 126 and range 128 of source dataset 105 and source dataset 106, respectively. In response to the determination of range 126 and range 128, filter unit 120 may compare range 126 with range 128 to produce a comparison result 210 based on condition 109. Comparison result 210 may be effective to indicate whether an overlap range 212, between range 126 and range 128, is present or absent. In response to production of comparison result 210, filter unit 120 may produce filtered datasets 156, 158 based on comparison result 210. After production of filtered datasets 156, 158, filter unit 120 may send filtered datasets 156, 158 to map portion 130. Map portion 130 may receive filtered datasets 156, 158, and in response, may transform filtered datasets 156, 158 into mapped datasets 160, 162, respectively.

In an example depicted in FIG. 2, filter unit 120 may identify attribute 123 in request 108 and/or condition 109 based on an indication in condition 109 that attribute 123 is a join attribute. In response to identifying attribute 123, filter unit 120 may determine a range (range 126) of values of attribute 123 in source dataset 105, and may determine a range (range 128) of values of attribute 123 in source dataset 106. In the example depicted in FIG. 2, range 126 of attribute 123 in source dataset 105 may be "3-6", which may indicate that attribute values associated with attribute 123 in source dataset 105 varies from a value of "3" to a value of "6". Similarly, range 128 of attribute 123 in source dataset 106 may be "1-8", which may indicate that attribute values associated with attribute 123 in source dataset 106 varies from a value of "1" to a value of "8".

In response to determining range 126 and range 128, filter unit 120 may compare range 126 with range 128 to produce comparison result 210. In the example depicted in FIG. 2, filter unit 120 may compare "3-6" (range 126) with "1-8" (range 128) to produce comparison result 210 based on condition 109, where comparison result 210 may indicate a presence of an overlap range 212, which in the example, is "3-6". Filter unit 120 may further determine minimum and maximum attribute values associated with attribute 123 in source datasets 105, 106 based on ranges 126, 128, or based on an analysis of source datasets 105, 106. Filter unit 120 may determine a minimum attribute value associated with attribute 123 in source dataset 105 is "3" and a maximum attribute value associated with attribute 123 in source dataset 105 is "6". Similarly, filter unit 120 may determine a minimum attribute value associated with attribute 123 in source dataset 106 is "1" and a maximum attribute value associated with attribute 123 in source dataset 106 is "8". Filter unit 120 may produce filtered datasets 156, 158 in response to determining a presence of overlap range 212, and/or minimum and maximum values of attribute 123 in source datasets 105, 106. In some examples, filter unit 120 may be further configured to determine a number of occurrences of each attribute value associated with attribute 123 in source datasets 105, 106. In some examples, filter unit 120 may produce filtered datasets 156, 158 based on the number of occurrences of each attribute value associated with attribute 123 in source datasets 105, 106.

Filter unit 120 may produce filtered datasets 156, 158 based on at least one of range 126, range 128, comparison result 210, condition 109 and/or maximum and minimum attribute values associated with attribute 123 in source datasets 105, 106. In the example depicted in FIG. 2, since condition 109 indicates a requirement for "105.A" to be less than "106.A", and overlap range 212 is "3-6", filter unit 120 may filter out data among source dataset 106 which may not satisfy condition 109, such as data corresponding to attribute values associated with attribute 123 that are less than "4". For example, filter unit 120 may filter out of data corresponding to "Y3" because an attribute value "3" associated with attribute 123 is not greater than any attribute value associated with attribute 123 of source dataset 105. Similarly, filter unit 120 may filter out data corresponding to "Y9" because an attribute value associated with attribute 123 is "1". As a result of filtering out data among source dataset 106, filter unit 120 may produce filtered dataset 158 by including data from source dataset 106 which are not filtered out. Filter unit 120, in response to producing filtered dataset 158, may send filtered dataset 158 to map portion 130. Filter unit 120 may determine that data among source dataset 105 may satisfy condition 109, thus, filter unit 120 may send source dataset 105 to map portion 130.

In an example where range 126 may be "4-6" and range 128 may be "1-3", filter unit 120 may determine an absence of overlap range 212 in comparison result 210. Filter unit 120 may determine a minimum attribute value associated with attribute 123 in source dataset 105 is "4" and a maximum attribute value associated with attribute 123 in source dataset 105 is "6". Filter unit 120 may determine a minimum attribute value associated with attribute 123 in source dataset 106 is "1" and a maximum attribute value associated with attribute 123 in source dataset 106 is "3". Since condition 109 indicates a requirement for "105.A" to be less than "106.A", and overlap range 212 is absent, filter unit 120 may determine that a join of source datasets 105, 106 would not satisfy condition 109. In response to determining that source datasets 105, 106 may not satisfy condition 109, filter unit 120 may not send any data to map portion 130. Filter unit 120 may further notify node processor 112 or distributed platform 101 that source datasets 105, 106 may not include data which satisfy condition 109.

In an example where range 126 may be "1-3" and range 128 may be "4-6", filter unit 120 may determine an absence of overlap range 212 in comparison result 210. Filter unit 120 may determine a minimum attribute value associated with attribute 123 in source dataset 105 is "1" and a maximum attribute value associated with attribute 123 in source dataset 105 is "3". Filter unit 120 may determine a minimum attribute value associated with attribute 123 in source dataset 106 is "4" and a maximum attribute value associated with attribute 123 in source dataset 106 is "6". Since condition 109 indicates a requirement for "105.A" to be less than "106.A", filter unit 120 may determine that source datasets 105, 106 may satisfy condition 109 even though overlap range 212 is absent. In response to determining that source datasets 105, 106 may satisfy condition 109, filter unit 120 may send at least a portion of source datasets 105, 106 to map portion 130.

In an example where range 126 may be "1-6" and range 128 may be "3-5", filter unit 120 may determine a presence of overlap range 212 in comparison result 210, where overlap range 212 may be "3-5". Filter unit 120 may determine a minimum attribute value associated with attribute 123 in source dataset 105 is "1" and a maximum attribute value associated with attribute 123 in source dataset 105 is "6". Filter unit 120 may determine a minimum attribute value associated with attribute 123 in source dataset 106 is "3" and a maximum attribute value associated with attribute 123 in source dataset 106 is "5". Since condition 109 indicate a requirement for "105.A" to be less than "106.A", filter unit 120 may filter out data among source datasets 105, 106 which may not satisfy condition 109, such as data corresponding to attribute values associated with attribute 123 that are greater than "4". As a result of filtering out data from source dataset 105, filter unit 120 may produce filtered dataset 156 by including data which are not filtered out from source dataset 105. Filter unit 120, in response to producing filtered dataset 156, may send filtered datasets 156 to map portion 130. Filter unit 120 may determine that source dataset 106 may satisfy condition 109, thus, filter unit 120 may send at least a portion of source dataset 106 to map portion 130.

In an example where range 126 may be "3-7" and range 128 may be "1-5", filter unit 120 may determine a presence of overlap range 212 in comparison result 210, where overlap range 212 may be "3-5". Filter unit 120 may determine a minimum attribute value associated with attribute 123 in source dataset 105 is "3" and a maximum attribute value associated with attribute 123 in source dataset 105 is "7". Filter unit 120 may determine a minimum attribute value associated with attribute 123 in source dataset 106 is "1" and a maximum attribute value associated with attribute 123 in source dataset 106 is "5". Since condition 109 indicate a requirement for "105.A" to be less than "106.A", filter unit 120 may filter out data corresponding to attribute values associated with attribute 123 that are greater than "4" in source dataset 105. Similarly, filter unit 120 may filter out data corresponding to attribute values associated with attribute 123 that are less than "4" in source dataset 106. As a result of filtering out data from source datasets 105, 106, filter unit 120 may produce filtered datasets 156, 158 by including data which are not filtered out from source datasets 105, 106. Filter unit 120, in response to producing filtered datasets 156, 158, may send filtered datasets 156, 158 to map portion 130.

Continuing with the example depicted in FIG. 2, where range 126 may be "3-6" and range 128 may be "1-8", map portion 130 may receive source dataset 105 and filtered dataset 158 and in response, may transform source datasets 105 and filtered dataset 158 to mapped datasets 160, 162, respectively. Map portion 130 may further receive request 108, which may include condition 109, from node processor 112 or distributed platform 101. Map unit 132 of map portion 130 may transform source dataset 105, filtered dataset 158, into mapped datasets 160, 162 based on condition 109. Map unit 132 may transform source dataset 105 into mapped dataset 160 by organizing data among source dataset 105 based on attribute 123 because attribute 123 is indicated as a join attribute by condition 109. In some examples, map unit 132 may further sort data among source dataset 105 based on attribute 123 to produce mapped dataset 160. As a result of transforming source dataset 105 into mapped dataset 160, mapped datasets 160, 162 may include indications of attributes 122, 123, and may exclude attribute 124. For example, a particular piece of data among mapped dataset 160 may be "6, X19", which may represent an attribute 123 of a value "6", and an attribute 122 of a value "X19" among source dataset 105. Similarly, map unit 132 may transform filtered dataset 158 into mapped dataset 162 by organizing data among filtered dataset 158 based on attribute 123 because attribute 123 is indicated as a join attribute by condition 109.

In some examples, filter instruction 121 may be stored in memory 103 of distributed platform 101. Distributed platform 101 may receive request 108 from device 182, and in response, may execute filter instruction 121 to generate one or more commands to process request 108. In the example depicted in FIG. 2, processor 102 of distributed platform 101 may generate a command 201, where command 201 may be a command for node 110 to determine range 126. Processor 102 of distributed platform 101 may generate a command 202, where command 202 may be a command for node 110 to determine range 128. Processor 102 of distributed platform 101 may generate a command 203, where command 203 may be a command for node 110 to compare range 126 and range 128 to produce comparison result 210. Processor 102 of distributed platform 101 may generate a command 204, where command 204 may be a command for node 110 to produce filtered dataset 156 based on comparison result 210. Processor 102 of distributed platform 101 may generate a command 205, where command 205 may be a command for node 110 to produce filtered dataset 158 based on comparison result 210. Processor 102 of distributed platform 101 may send commands 201, 202, 203, 204, 205 to node 110. Node processor 112 of node 110 may command filter unit 120 to execute commands 201, 202, 203, 204, 205 in order to process request 108.

Figure 3:
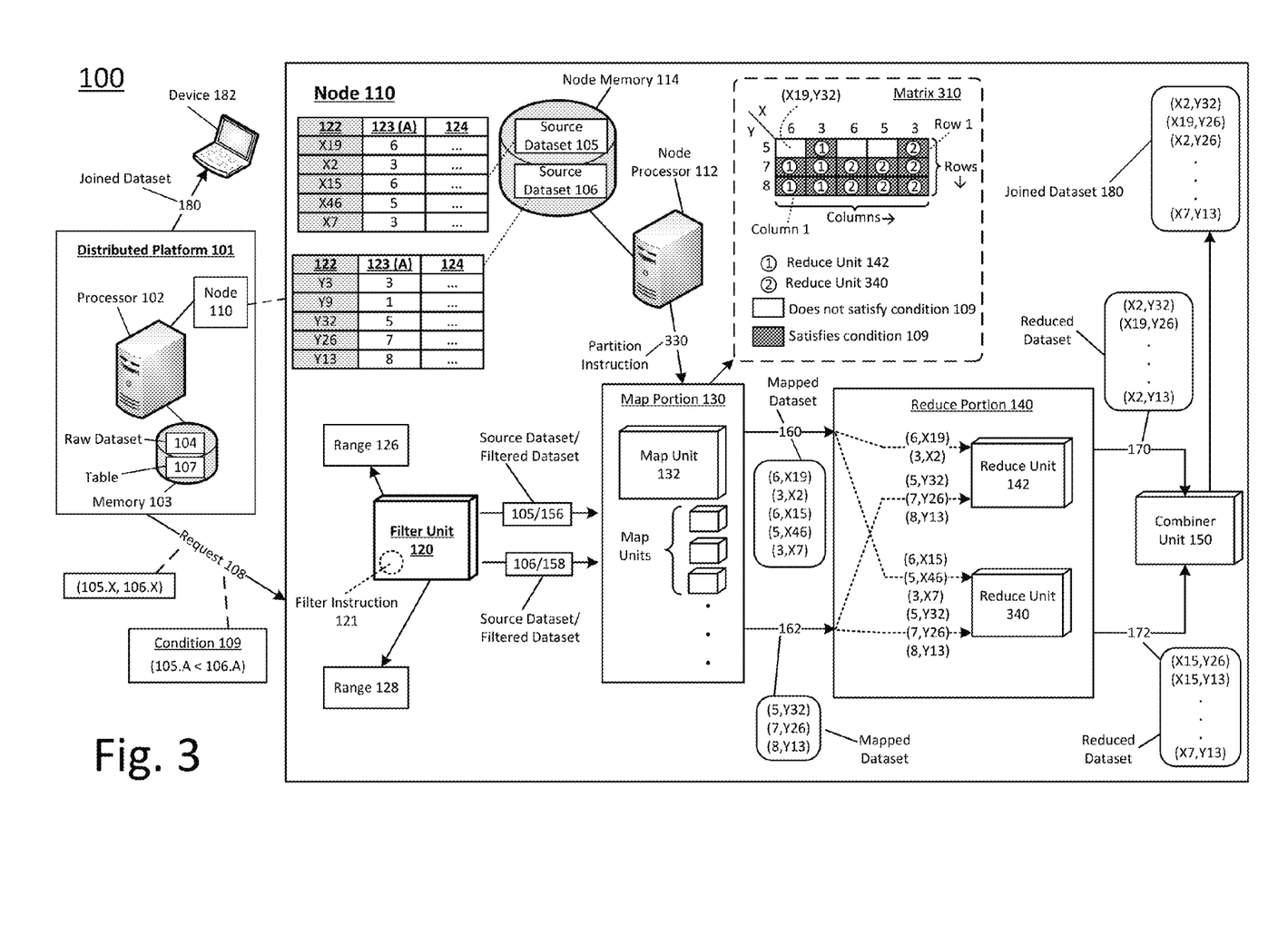
FIG. 3 illustrates the example system of FIG. 1 with additional detail relating to a production of reduced datasets and a joined dataset.

FIG. 3 illustrates example system 100 of FIG. 1 with additional detail relating to a production of reduced datasets and a joined dataset, arranged in accordance with at least some embodiments described herein. FIG. 3 is substantially similar to system 100 of FIG. 1, with additional details. Those components in FIG. 3 that are labeled identically to components of FIG. 1 will not be described again for the purposes of clarity.

As will be described in more detail below, reduce portion 140 may receive mapped datasets 160, 162 from map portion 130. In some examples, prior to map portion 130 sending mapped datasets 160, 162 to reduce portion 140, mapped portion 130 may determine a matrix 310, where matrix 310 may be used to shuffle, and/or partition mapped datasets 160, 162. As a result of the partitioning, map portion 130 may distribute parts of mapped datasets 160, 162 among reduce units in reduce portion 140. Reduce portion 140 may transform mapped datasets 160, 162 into reduced datasets 170, 172, and may send reduced datasets 170, 172 to combiner unit 150. Combiner unit 150 may join source datasets 105, 106 by combining reduced datasets 170, 172, to produce joined dataset 180.

In an example depicted in FIG. 3, map unit 132 of map portion 130 may determine matrix 310 based on mapped datasets 160, 162. As shown, matrix 310 may include one or more rows, and may include one or more columns. Each column of matrix 310 may be associated with a respective piece of data among mapped dataset 160. For example, a first column (column 1) of matrix 310 may be associated with a first piece of data among mapped dataset 160, which is "6, X19". Each row of matrix 310 may be associated with a respective piece of data among mapped dataset 162. For example, a first row (row 1) of matrix 310 may be associated with a first piece of data among mapped dataset 162, which is "5, Y32". Each column of matrix 310 may be labeled according to attribute values associated with attribute 123 in mapped dataset 160. For example, column 1 of matrix 310 corresponding to "X19" may be labeled as "6". Similarly, each row of matrix 310 may be labeled according to attribute values associated with attribute 123 in mapped dataset 162. For example, row 1 of matrix 310 corresponding to "Y32" may be labeled as "5". Map unit 132 may determine matrix 310 by determining a number of rows and a number of columns to be included in matrix 310 based on mapped datasets 160, 162. Since mapped datasets 160, 162 include five and three pieces of data, respectively, map unit 132 may determine that matrix 310 includes five columns and three rows. In some examples, rows and columns of matrix 310 may be interchangeable, such as using rows to represent attribute 122 of source dataset 105 and columns to represent attribute 122 of source dataset 106.

Map unit 132 may determine which pairs of data among mapped datasets 160, 162 may satisfy condition 109 based on matrix 310. In the example depicted in FIG. 3, map unit 132 may determine that a pair of "X19, Y32" may not satisfy condition 109 because a row label of "6" is greater than a column label of "5" (denoted by unshaded box in matrix 310). Map unit 132 may further evaluate each pair of source dataset 105, 106 among matrix 310. For example, map unit 132 may determine that a pair of "X2, Y32" may satisfy condition 109 because a row label of "3" is less than a column label of "7" (denoted as shaded box in matrix 310). After evaluating each pair of source datasets 105, 106, map unit 132 may partition mapped datasets 160, 162 using matrix 310, and may shuffle data among mapped datasets 160, 162 in order to distribute mapped datasets 160, 162 among reduce units 142, 340.

Map unit 132 may shuffle, and/or partition mapped datasets 160, 162 using matrix 310 based on a partition instruction 330 received from node processor 112 or distributed platform 101. In the example depicted in FIG. 3, partition instruction 330 may indicate a presence of two reduce units, reduce unit 142 and reduce unit 340, being available in reduce portion 140. Based on partition instruction 330, map unit 132 may partition matrix 310 into two parts, where a first part may be associated with data to be assigned to reduce unit 142 and a second part may be associated with data to be assigned to reduce unit 340. As a result of partitioning matrix 310 into two parts, data corresponding to "X19, X2" in mapped dataset 160, and data corresponding to "Y32, Y26, Y13" in mapped dataset 162 may be sent to reduce unit 142. Similarly, data corresponding to "X15, X46, X7" in mapped dataset 160, and data corresponding to "Y32, Y26, Y13" in mapped dataset 162 may be sent to reduce unit 340.

In an example where partition instruction 330 may indicate a presence of three reduce units, map unit 132 may partition matrix 310 into three parts. For example, a first part may be columns of matrix 310 associated with attribute value "3", such that data corresponding to "X2, X7" of mapped dataset 160 and "Y32, Y26, Y13" of mapped dataset 162 may be sent to a first reduce unit. Similarly, a second part may be columns of matrix 310 associated with attribute value "5", such that data corresponding to "X46" of mapped dataset 160 and "Y32, Y26, Y13" of mapped dataset 162 may be sent to a second reduce unit. Similarly, a third part may be columns of matrix 310 associated with attribute value "6", such that data corresponding to "X19, X15" of mapped dataset 160 and "Y32, Y26, Y13" of mapped dataset 162 may be sent to a third reduce unit.

In an example where partition instruction 330 may indicate a presence of three reduce units, map unit 132 may partition matrix 310 into three parts. For example, a first part may be row of matrix 310 associated with attribute value "5", such that data corresponding to "X2, X7" of mapped dataset 160 and "Y32" of mapped dataset 162 may be sent to a first reduce unit. Similarly, a second part may be rows of matrix 310 associated with attribute value "7", such that data corresponding to "X19, X2, X15, X46, X7" of mapped dataset 160 and "Y26" of mapped dataset 162 may be sent to a second reduce unit. Similarly, a third part may be rows of matrix 310 associated with attribute value "8", such that data corresponding to "X19, X2, X15, X46, X7" of mapped dataset 160 and "Y13" of mapped dataset 162 may be sent to a third reduce unit.

In an example where partition instruction 330 may indicate a need to minimize processing time, map unit 132 may partition matrix 310 into relatively large number of parts such that more reduce units in reduce portion 140 may be assigned to process mapped datasets 160, 162. In examples where partition instruction 330 indicate a need to minimize resource usage, map unit 132 may partition a relatively small number of parts such that a minimal number of reduce units are assigned to process mapped datasets 160, 162. In some examples, partition instruction 330 may be indicated by a user of system 100, such as being indicated in request 108. In some examples, partition instruction may indicate various limitations or requirements related to usage of resources and/or components of system 100.

Reduce portion 140 may receive data among mapped datasets 160, 162, and may transform the mapped datasets 160, 162 into reduced datasets 170, 172. In the example depicted in FIG. 3, reduce unit 142 may receive data corresponding to "X19, X2, Y32, Y26, Y13", and may pair "X19, X2" with "Y32, Y26, Y13" based on condition 109. Reduce unit 142 may pair "X2" with "Y32" because an attribute value associated with attribute 123 and corresponding to "X2" is "3", which is less than "5" (an attribute value associated with attribute 123 and corresponding to "Y32"). Similarly, reduce unit 142 may not pair "X19" with "Y32" because an attribute value associated with attribute 123 and corresponding to "X19" is "6", which is greater than "5" (an attribute value associated with attribute 123 and corresponding to "Y32"). Reduce unit 142 may continue to transform data of mapped datasets 160, 162, received at reduced unit 142, into reduced dataset 170. Similarly, reduce unit 340 may continue to transform data of mapped datasets 160, 162, received at reduced unit 340, into reduced dataset 172. In some examples, map portion 130 may be configured to perform the operations of reduce portion 140, such as transforming mapped datasets 160, 162 into reduced datasets 170, 172.

In response to a completion of transforming mapped datasets 160, 162 into reduced datasets 170, 172, reduce portion 140 may send reduced datasets 170, 172 to combiner unit 150. Combiner unit 150 may combine reduced datasets 170, 172 to produce joined dataset 180. Combiner unit 150 may be further configured to send joined dataset 180 to processor 102 or distributed platform 101. Distributed platform 101 may send joined dataset 180 to device 182 to fulfill request 108.

A system in accordance with the present disclosure may benefit distributed systems, or systems associated with a MapReduce framework. In an example associated with a MapReduce framework, a filter unit may be implemented such that data that fails to satisfy a condition indicated by a join request may be filtered out prior to performing a map function on the source data. As a result of the filtering, an amount of input into a map portion, and an amount of output from the map portion, may be reduced, thus reducing overhead, latency, processing power, resource usage, energy consumption, etc. In some examples, the filter unit may be implemented in accordance with a join request indicating an equal join or an inequality join. In some examples, the filter unit may be implemented with either a map-side join or a reduce-side join in a MapReduce framework.

Figure 4:
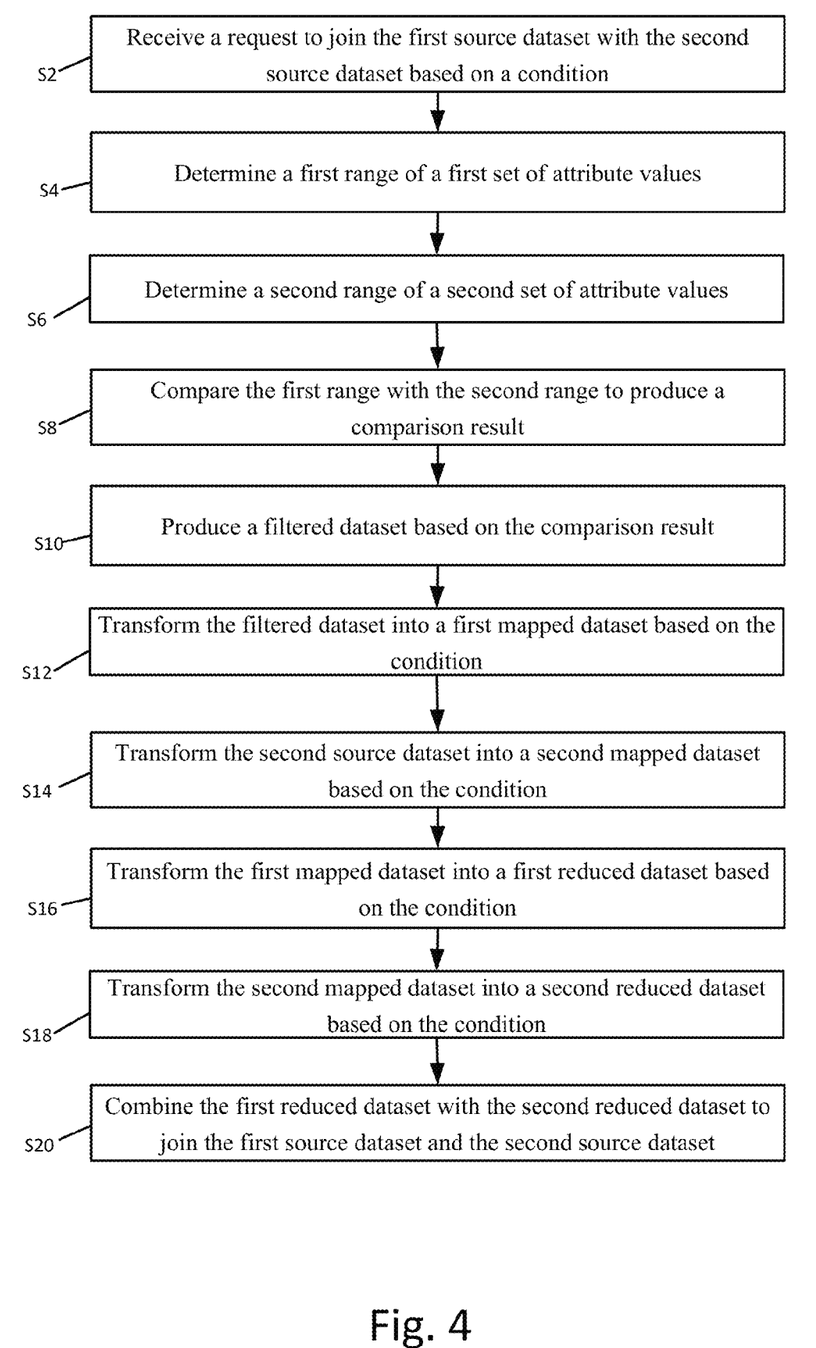
FIG. 4 illustrates a flow diagram for an example process to implement combination of datasets with use of a dataset filter.

FIG. 4 illustrates a flow diagram for an example process to implement combination of datasets with use of a dataset filter, arranged in accordance with at least some embodiments presented herein. The process in FIG. 4 could be implemented using, for example, system 100 discussed above. An example process may include one or more operations, actions, or functions as illustrated by one or more of blocks S2, S4, S6, S8, S10, S12, S14, S16, S18 and/or S20. Although illustrated as discrete blocks, various blocks may be divided into additional blocks, combined into fewer blocks, or eliminated, depending on the desired implementation.

Processing may begin at block S2, "Receive a request to join the first source dataset with the second source dataset based on a condition". At block S2, a processor may receive a request to join a first source dataset with a second source dataset based on a condition. The condition may be associated with an attribute of the first source dataset and the second source dataset. In some examples, the condition may include an indication of an inequality relation.

Processing may continue from block S2 to block S4, "Determine a first range of a first set of attribute values". At block S4, the processor may determine a first range of a first set of attribute values that corresponds to the first source dataset. The first set of attribute values may be associated with the attribute. In some examples, the processor may determine a first minimum value of the first set of attribute values based on the first range. The processor may further determine a first maximum value of the first set of attribute values based on the first range.

Processing may continue from block S4 to block S6, "Determine a second range of a second set of attribute values". At block S6, the processor may determine a second range of a second set of attribute values that corresponds to the second source dataset. The second set of attribute values may be associated with the attribute. In some examples, the processor may determine a second minimum value of the second set of attribute values based on the second range. The processor may further determine a second maximum value of the second set of attribute values based on the second range.

Processing may continue from block S6 to block S8, "Compare the first range with the second range to produce a comparison result". At block S8, the processor may compare the first range with the second range to produce a comparison result. In some examples, the processor may determine a presence or an absence of an overlap range between the first range and second range based on the comparison result.

Processing may continue from block S8 to block S10, "Produce a filtered dataset based on the comparison result". At block S10, the processor may produce a filtered dataset based on the comparison result. The filtered dataset may include at least a portion of the first source dataset. In some examples, the processor may produce another filtered dataset in response to a presence or absence of an overlap range indicated by the comparison result, where the second filtered dataset may include at least a portion of the second source dataset.

Processing may continue from block S10 to block S12, "Transform the filtered dataset into a first mapped dataset based on the condition". At block S12, a map unit may transform the filtered dataset into a first mapped dataset based on the condition. The filtered dataset may be sent from the processor to the map unit.

Processing may continue from block S12 to block S14, "Transform the second source dataset into a second mapped dataset based on the condition". At block S14, the map unit may transform the second source dataset into a second mapped dataset based on the condition. The second source dataset may be sent from the processor to the map unit.

Processing may continue from block S14 to block S16, "Transform the first mapped dataset into a first reduced dataset based on the condition". At block S16, a reduce unit may transform the first mapped dataset into a first reduced dataset based on the condition. The first mapped dataset may be sent from the map unit to the reduce unit.

Processing may continue from block S16 to block S18, "Transform the second mapped dataset into a second reduced dataset based on the condition". At block S18, the reduce unit may transform the second mapped dataset into a second reduced dataset based on the condition. The second mapped dataset may be sent from the map unit to the reduce unit.

Processing may continue from block S18 to block S20, "Combine the first reduced dataset with the second reduced dataset to join the first source dataset and the second source dataset". At block S20, a combiner unit may combine the first reduced dataset with the second reduced dataset to join the first source dataset and the second source dataset. The first and second reduced dataset may be sent from the reduce unit to the combiner unit.

FIG. 5 illustrates an example computer program product that can be utilized to implement combination of datasets with use of a dataset filter, arranged in accordance with at least some embodiments presented herein. Program product 500 may include a signal bearing medium 502. Signal bearing medium 502 may include one or more instructions 504 that, when executed by, for example, a processor, may provide the functionality described above with respect to FIGS. 1-4. Thus, for example, referring to system 100, distributed platform 101 may undertake one or more of the blocks shown in FIG. 5 in response to instructions 504 conveyed to the system 100 by medium 502.

In some implementations, signal bearing medium 502 may encompass a computer-readable medium 506, such as, but not limited to, a hard disk drive, a Compact Disc (CD), a Digital Versatile Disc (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, program product 500 may be conveyed to one or more modules of the system 100 by an RF signal bearing medium 502, where the signal bearing medium 502 is conveyed by a wireless communications medium 510 (e.g., a wireless communications medium conforming with the IEEE 802.11 standard).

Figure 6:
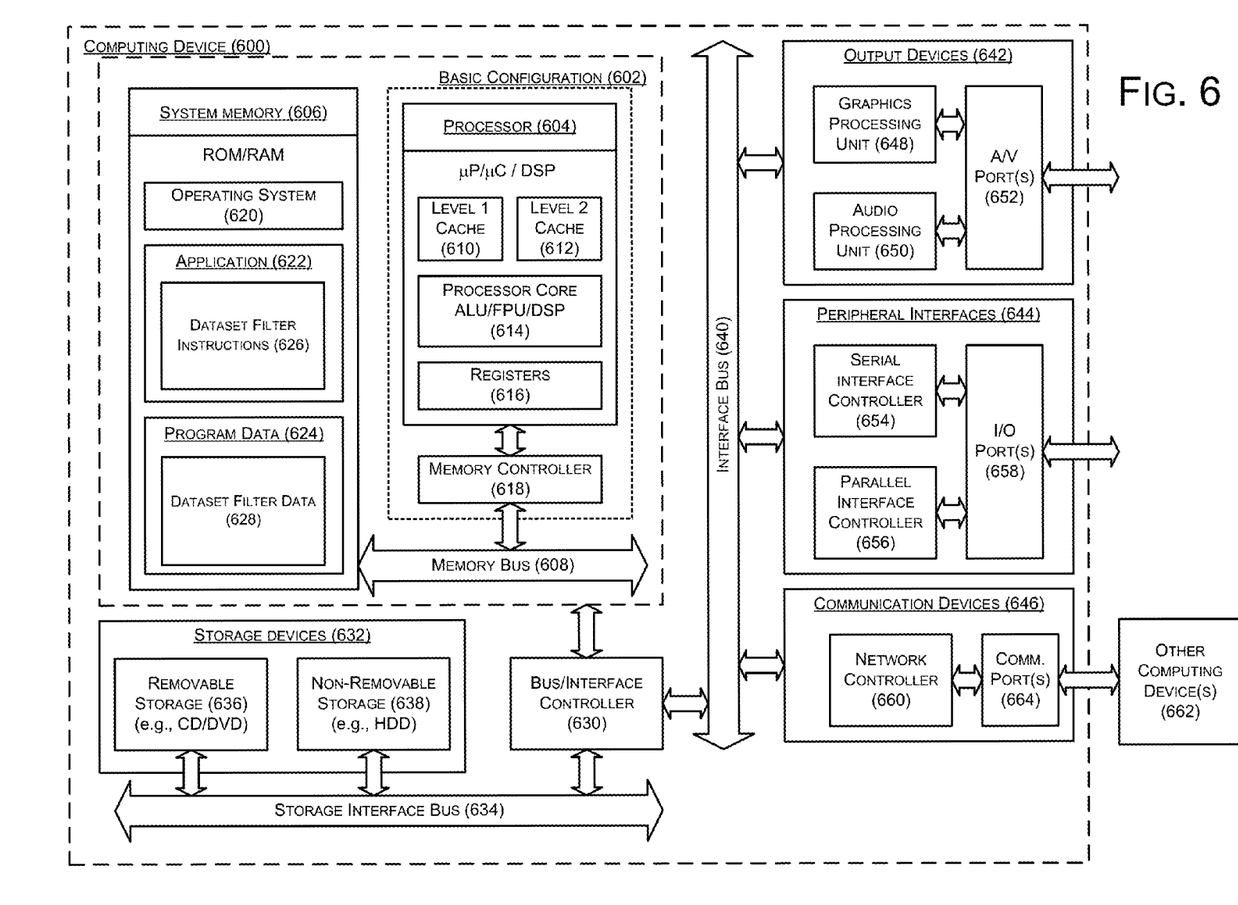
FIG. 6 is a block diagram illustrating an example computing device that is arranged to implement combination of datasets with use of a dataset filter.

FIG. 6 is a block diagram illustrating an example computing device that is arranged to implement combination of datasets with use of a dataset filter, arranged in accordance with at least some embodiments presented herein. In a very basic configuration 602, computing device 600 typically includes one or more processors 604 and a system memory 606. A memory bus 608 may be used for communicating between processor 604 and system memory 506.

Depending on the desired configuration, processor 604 may be of any type including but not limited to a microprocessor (μP), a microcontroller (μC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include dataset filter instructions 626 that is arranged to perform the functions as described herein including those described previously with respect to FIGS. 1-5. Program data 624 may include dataset filter data 628 that may be useful for combination of datasets with use of a dataset filter as described herein. In some embodiments, application 622 may be arranged to operate with program data 624 on operating system 620 such that combination of datasets with use of a dataset filter may be provided. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disc (CD) drives or digital versatile disc (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to join a first source dataset with a second source dataset, the method comprising:
   receiving, by a processor, a request to join the first source dataset with the second source dataset based on a condition, wherein the condition is associated with an attribute of the first source dataset and the second source dataset;
   determining, by the processor, a first range of a first set of attribute values, wherein the first set of attribute values corresponds to the first source dataset, and wherein the first set of attribute values is associated with the attribute;
   determining, by the processor, a second range of a second set of attribute values, wherein the second set of attribute values corresponds to the second source dataset, and wherein the second set of attribute values is associated with the attribute;
   comparing, by the processor, the first range with the second range to produce a comparison result;
   determining, by the processor, a presence or absence of an overlap range between the first range and the second range based on the comparison result;
   producing, by the processor, a filtered dataset based on the determination of the presence or absence of the overlap range and based on another comparison, wherein the another comparison, associated with the condition, comprises comparing each attribute value of the first set of attribute values with each attribute value of the second set of attribute values, and
   wherein the filtered dataset includes:
      at least a portion of the first source dataset based on a determination of the presence of the overlap range and when the condition is satisfied;
      at least another portion of the first source dataset based on a determination of the absence of the overlap range and when the condition is satisfied; and
      zero data based on the determination of the absence of the overlap range and when the condition is not satisfied;
   transforming, by a map unit, the produced filtered dataset into a first mapped dataset based on the condition, wherein transforming using the produced filtered dataset facilitates reduction of an amount of input to the map unit and an amount of output from the map unit, thereby enabling reduction of overhead and processing power;
   transforming, by the map unit, the second source dataset into a second mapped dataset based on the condition;
   transforming, by a reduce unit, the first mapped dataset into a first reduced dataset based on the condition;

transforming, by the reduce unit, the second mapped dataset into a second reduced dataset based on the condition; and combining, by a combiner unit, the first reduced dataset with the second reduced dataset to facilitate joining of the first source dataset with the second source dataset based on the condition that is associated with the attribute of the first source dataset and the second source dataset, in a social media platform.

2. The method of claim 1, wherein the filtered dataset is a first filtered dataset, the method further comprising:
producing, by the processor, a second filtered dataset in response to the determination of the presence of the overlap range, wherein the second filtered dataset includes at least a portion of the second source dataset; and
transforming, by the map unit, the second filtered dataset into the second mapped dataset based on the condition.

3. The method of claim 1, wherein the filtered dataset is a first filtered dataset, the method further comprising:
producing, by the processor, a second filtered dataset in response to the determination of the absence of the overlap range, wherein the second filtered dataset includes at least a portion of the second source dataset; and
transforming, by the map unit, the second filtered dataset into the second mapped dataset based on the condition.

4. The method of claim 1, wherein the condition includes an indication of an inequality relation.

5. The method of claim 1, wherein determining the first range of the first set of attribute values and determining the second range of the second set of attribute values comprises:
determining, by the processor, a first minimum value of the first set of attribute values of the first range;
determining, by the processor, a first maximum value of the first set of attribute values of the first range;
determining, by the processor, a second minimum value of the second set of attribute values of the second range; and
determining, by the processor, a second maximum value of the second set of attribute values of the second range.

6. A system effective to join a first source dataset with a second source dataset, the system comprising:
a memory configured to store the first source dataset and the second source dataset, wherein the first source dataset corresponds to a first set of attribute values of an attribute, and wherein the second source dataset corresponds to a second set of attribute values of the attribute;
a filter unit configured to be in communication with the memory;
a map unit configured to be in communication with the memory and the filter unit;
a reduce unit configured to be in communication with the memory and the map unit; and
a combiner unit configured to be in communication with the reduce unit;
the filter unit being configured to:
receive a request to join the first source dataset with the second source dataset based on a condition, wherein the condition is associated with the attribute;
determine a first range of the first set of attribute values;
determine a second range of the second set of attribute values;
compare the first range with the second range to produce a comparison result;
determine a presence or absence of an overlap range between the first range and the second range based on the comparison result;
produce a first filtered dataset based on the determination of the presence or absence of the overlap range, wherein the first filtered dataset includes:
at least a portion of the first source dataset based on a determination of the presence of the overlap range and when the condition is satisfied;
at least another portion of the first source dataset based on a determination of the absence of the overlap range and when the condition is satisfied; and
zero data based on the determination of the absence of the overlap range and when the condition is not satisfied; and
send the first filtered dataset to the map unit;
the map unit being configured to:
transform the produced first filtered dataset into a first mapped dataset based on the condition, wherein the transformation using the produced first filtered dataset facilitates reduction of an amount of input to the map unit and an amount of output from the map unit, thereby enabling reduction of overhead and processing power;
transform the second source dataset into a second mapped dataset based on the condition; and
send the first and second mapped datasets to the reduce unit;
the reduce unit being configured to:
transform the first mapped dataset into a first reduced dataset;
transform the second mapped dataset into a second reduced dataset; and
send the first and the second reduced datasets to the combiner unit; and
the combiner unit being configured to combine the first reduced dataset with the second reduced dataset, to facilitate joining of the first source dataset with the second source dataset, based on the condition that is associated with the attribute, in a social media platform.

7. The system of claim 6, wherein the filter unit is further configured to
produce a second filtered dataset in response to the determination of the presence of the overlap range, wherein the produced second filtered dataset includes at least a portion of the second source dataset; and
wherein the map unit is further configured to transform the produced second filtered dataset into the second mapped dataset based on the condition.

8. The system of claim 6, wherein the filter unit is further configured to
produce a second filtered dataset in response to the determination of the absence of the overlap range, wherein the produced second filtered dataset includes at least a portion of the second source dataset; and
wherein the map unit is further configured to transform the produced second filtered dataset into the second mapped dataset based on the condition.

9. The system of claim 6, wherein the condition includes an indication of an inequality relation.

10. The system of claim 6, wherein the determination of the first range of the first set of attribute values and the determination of the second range of the second set of attribute values comprises:
determine a first minimum value of the first set of attribute values of the first range;

determine a first maximum value of the first set of attribute values of the first range;
determine a second minimum value of the second set of attribute values of the second range; and
determine a second maximum value of the second set of attribute values of the second range.

11. A system effective to process a request to join a first source dataset with a second source dataset in a social media platform, the system comprising:
a memory configured to store a filter instruction;
a processor configured to be in communication with the memory; and
a node configured to be in communication with the processor, the processor being configured to:
receive the request to join the first source dataset with the second source dataset based on a condition, wherein the condition is associated with an attribute of the first source dataset and the second source dataset, wherein the first source dataset corresponds to a first set of attribute values of the attribute, and wherein the second source dataset corresponds to a second set of attribute values of the attribute;
execute the filter instruction to generate a first command to determine a first range of the first set of attribute values;
execute the filter instruction to generate a second command to determine a second range of the second set of attribute values;
execute the filter instruction to generate a third command to compare the first range with the second range to produce a comparison result;
execute the filter instruction to generate a fourth command to produce a first filtered dataset based on the comparison result, wherein the first filtered dataset includes at least a portion of the first dataset, wherein production of the first filtered dataset is based on a first comparison, and wherein the first comparison, associated with the condition, comprises comparison of each attribute value of the first set of attribute values with each attribute value of the second set of attribute values;
execute the filter instruction to generate a fifth command to produce a second filtered dataset based on the comparison result, wherein the second filtered dataset includes at least a portion of the second dataset, and wherein production of the second filtered dataset is based on a second comparison, and wherein the second comparison, associated with the condition, comprises comparison of each attribute value of the first set of attribute values with each attribute value of the second set of attribute values; and
send the first, second, third, fourth, and fifth commands to the node, wherein an execution of the first, second, third, fourth, and fifth commands facilitate reduction of overhead and processing power of the node.

12. The system of claim 11, wherein the node comprises:
a filter unit;
a map unit configured to be in communication with the filter unit;
a reduce unit configured to be in communication with the map unit; and
a combiner unit configured to be in communication with the reduce unit;
the filter unit of the node being configured to:
execute the first command to determine the first range of the first set of attribute values;
execute the second command to determine the second range of the second set of attribute values;
execute the third command to compare the first range with the second range to produce the comparison result;
execute the fourth command to produce the first filtered dataset based on the comparison result;
execute the fifth command to produce the second filtered dataset based on the comparison result; and
send the first and second filtered datasets to the map unit of the node;
the map unit of the node being configured to:
transform the first filtered dataset into a first mapped dataset based on the condition;
transform the second filtered dataset into a second mapped dataset based on the condition; and
send the first and second mapped datasets to the reduce unit of the node;
the reduce unit of the node being configured to:
transform the first mapped dataset into a first reduced dataset;
transform the second mapped dataset into a second reduced dataset; and
send the first and second reduced datasets to the combiner unit; and
the combiner unit being configured to combine the first reduced dataset with the second reduced dataset to join the first source dataset with the second source dataset.

13. The system of claim 12, wherein the node is further configured to send the joined first source dataset and second source dataset to the processor.

14. The system of claim 11, wherein the condition includes an indication of an inequality relation.

15. The system of claim 11, wherein the determination of the first range of the first set of attribute values and the determination of the second range of the second set of attribute values comprises:
determine a first minimum value of the first set of attribute values of the first range;
determine a first maximum value of the first set of attribute values of the first range;
determine a second minimum value of the second set of attribute values of the second range; and
determine a second maximum value of the second set of attribute values of the second range.

16. The system of claim 11, wherein the node comprises a node memory, and wherein the processor is further configured to:
divide a raw dataset into the first source dataset and the second source dataset;
store the first source dataset and the second source dataset in the node memory of the node;
in response to the receipt of the request, identify the node based on the first source dataset and the second source dataset being stored in the node memory of the node; and
send the first, second, third, fourth, and fifth commands to the node in response to the identification of the node.

17. The method of claim 1, further comprising:
determining, by the map unit, a particular number of partitions of a mapped dataset, which is associated with the first mapped dataset and the second mapped dataset, based on partition instructions received from the processor, wherein the partition instructions include instructions to minimize processing time and resource usage, and wherein the particular number of the partitions of the mapped dataset is based on the processing time and the resource usage.

18. The system of claim 6, wherein the filter unit is configured to produce the first filtered dataset based on a number of occurrences of each attribute value of the first set of attribute values and the second set of attribute values.

* * * * *